United States Patent
Pennington et al.

(10) Patent No.: US 8,087,088 B1
(45) Date of Patent: Dec. 27, 2011

(54) USING FUZZY CLASSIFICATION MODELS TO PERFORM MATCHING OPERATIONS IN A WEB APPLICATION SECURITY SCANNER

(75) Inventors: William Pennington, San Jose, CA (US); Jeremiah Grossman, San Jose, CA (US); Robert Stone, Mountain View, CA (US); Siamak Pazirandeh, San Diego, CA (US)

(73) Assignee: Whitehat Security, Inc., Santa Clara, CA (US)

( * ) Notice: Subject to any disclaimer, the term of this patent is extended or adjusted under 35 U.S.C. 154(b) by 1035 days.

(21) Appl. No.: 11/864,736

(22) Filed: Sep. 28, 2007

Related U.S. Application Data

(60) Provisional application No. 60/827,405, filed on Sep. 28, 2006.

(51) Int. Cl.
*G06F 11/00* (2006.01)
*G06F 12/14* (2006.01)
*G06F 12/16* (2006.01)
*G08B 23/00* (2006.01)

(52) U.S. Cl. .......... 726/25; 715/234; 715/760; 709/206
(58) Field of Classification Search ............... 726/25
See application file for complete search history.

(56) References Cited

U.S. PATENT DOCUMENTS

| | | | |
|---|---|---|---|
| 7,237,265 B2 * | 6/2007 | Reshef et al. | 726/25 |
| 2004/0103315 A1 * | 5/2004 | Cooper et al. | 713/201 |
| 2006/0048214 A1 * | 3/2006 | Pennington et al. | 726/5 |
| 2006/0242104 A1 * | 10/2006 | Ellis et al. | 707/1 |
| 2007/0016615 A1 * | 1/2007 | Mohan et al. | 707/104.1 |
| 2007/0016960 A1 * | 1/2007 | Glaser et al. | 726/27 |
| 2007/0043702 A1 * | 2/2007 | Lakshminarayanan et al. | 707/3 |
| 2007/0079379 A1 * | 4/2007 | Sprosts et al. | 726/24 |
| 2007/0192709 A1 * | 8/2007 | Popp et al. | 715/760 |
| 2008/0010535 A1 * | 1/2008 | Dasgupta | 714/38 |

* cited by examiner

*Primary Examiner* — David Pearson
*Assistant Examiner* — Mahfuzur Rahman
(74) *Attorney, Agent, or Firm* — Kilpatrick Townsend and Stockton LLP; Phillip H. Albert

(57) ABSTRACT

A system provides for fuzzy classification in comparisons of scanner responses. A web application test suite performs tests against a web application by sending client requests from a testing computer to the server running the web application and checking how the web application responds. A thorough web application security scan might involve thousands of checks and responses. As a result, some sort of programmatic analysis is needed. One such evaluation involves comparing one response against another. Response matching that compares two HTTP responses might use fuzzy classification processes.

18 Claims, 5 Drawing Sheets

404 error: File not found

The URL you requested was not found.

Did you mean to type http://www.<system under test>.com? You will be automatically redirected there in five seconds.

Maybe you would like to look at:

- The main page

*FIG. 4*

The page you are looking for has moved, been replaced, or is currently unavailable to view.

Bookmarks and External Links

If you previously bookmarked a page and have now reached this message, check to make sure the link was not shortened, or go to our home page to find the page from there.

Links From Within Our Site

We've been upgrading this site. If you selected a link on our site and reached this message use the Back button to return to the previous page and select a different link, or follow this link to our home page.

*FIG. 5*

USING FUZZY CLASSIFICATION MODELS TO PERFORM MATCHING OPERATIONS IN A WEB APPLICATION SECURITY SCANNER

CROSS-REFERENCES TO RELATED APPLICATIONS

This application claims priority to U.S. Provisional Patent Application No. 60/827,405, entitled "Using Fuzzy Classification Models to Perform Matching Operations in a Web Application Security Scanner" filed Sep. 28, 2006, which is hereby incorporated in its entirety.

BACKGROUND OF THE INVENTION

The present invention relates to network server security in general and in particular to web application security scanning.

There are a number of different configurations of network client-server interfaces available today, but the most common network in use is the Internet, a global internetwork of networks and networks that use Internet protocols and/or interfaces, such as extranets, intranets, local services, and other variations. In the general case, to which inventions described herein apply, clients connect to servers over the network and clients are not always trusted computers. As a result, the designers of the servers need to ensure that untrusted clients cannot perform malicious acts or access unauthorized portions of the server through the network.

One approach to ensure that servers cannot be accessed in an unauthorized manner is to only provide access to secured and trusted clients. However, in many situations, that is not possible. For example, if a merchant was running an on-line store, the merchant would want to allow most anyone who has a computer to access the servers providing the on-line store functionality, but do so in a way that still prevents unauthorized interactions with the servers.

Server security is more than just requiring a username and password from each client before responding to client requests, since even a logged in user might try for unauthorized access and a typical service provided by a server might include content and functionality for use by unauthenticated and unlogged-in clients. One approach to server security is to review all of the code that runs on the server and verify that it does not include statements that allow for unauthorized activity and review all the files present on the server and their respective permissions, side-effects, etc. While this might be practical for a small installation, say an FTP server that serves up predefined files to all comers, it is often not practical with complex, interactive applications that have many response modes.

One common use of servers in this environment, but not an exclusive use, is that of a web application. As used herein, "web" refers to a collection of documents/files, some of which have references, or links, to other documents/files in the collection. One example of a web is the World Wide Web ("WWW"), a collection of files served up by WWW servers (also called "web servers") using HTTP protocols or something similar. The "WWW" gets its name from the fact that most of these documents/files can be almost anywhere in the world and can be accessed anywhere in the world where there is Internet connectivity.

A web application is an application that runs on one or more server and provides some functionality or service in response to client requests received over a network using web protocols (i.e., HTTP, HTTPS, or something similar). An example of a web application is a database interface, wherein a database runs on a database system and clients can access data in that database system by sending a request for service over the network to a web application server. The web application server receives the request for service and decides, according to how it is programmed, what to do with the request. It can ignore the request, send an error message back to the client, or trigger an operation with the database system and respond to the client's request by sending the client the results of the database operation.

In a highly specific example, suppose a client computer system is operated by a customer seeking to configure and purchase a laptop computer. The customer would direct the client computer system to access a web application server operated by a vendor of laptop computers. The client computer system might send a request to the web application server via the network requesting a home page of the vendor. The web application server might respond with a home page that includes features allowing the client to interact with content on the home page (such as by selecting from available model names, features, etc.), send a subsequent request to the server, etc.

All the while, the web application server is making decisions about what is appropriate to send and what is not appropriate to send, based on its programming. For example, if the client computer sends a request for an updated page with updated pricing for new options selected by the customer, the web application server might perform some calculations, perform some database look-ups, generate a new dynamic web page and return that web page to the client computer in response to the request. However, if the client computer sends a request to see data about what someone else ordered, or internal data from the database server, the web application should properly refuse to respond to the request.

Because web applications are so complex, securing a web application and testing for security vulnerabilities, often involves an automated testing of the web application. Client-side web application testing refers to tests that are run from a client's point of view. For example, a client-side test suite might have logic for logging in to a web application, applying valid and invalid requests to the web application, noting the web application's responses and evaluating those responses. For example, if the test suite sends a request to the web application for ordering products where the prices have been altered and the response is "invalid order", the test suite might note that the web application is secure in that regard, but if the response is "thank you for your order", the test suite might note that the web application is not secure.

Once vulnerabilities have been identified, they can be brought to the attention of a web application designer for handling. Of course, if vulnerabilities are missed by the automated web application test suite, those vulnerabilities might never get fixed. Ideally, these vulnerabilities can be spotted programmatically, so that an analyst does not have to manually review all of the responses of the web application. Unfortunately, the wide variety of possible responses of a web application precludes trivial response checking.

In view of the above, the inventions described herein provide improvements over existing approaches.

BRIEF SUMMARY OF THE INVENTION

Embodiments of the present invention provide for fuzzy classification in comparisons of scanner responses. A web application test suite performs tests against a web application by sending client requests from a testing computer to the server running the web application and checking how the web application responds. A thorough web application security scan might involve thousands of checks and responses. As a result, some sort of programmatic analysis is needed. One such evaluation involves comparing one response against another. Response matching that compares two HTTP responses might use fuzzy classification processes.

The following detailed description together with the accompanying drawings will provide a better understanding of the nature and advantages of the present invention.

BRIEF DESCRIPTION OF THE DRAWINGS

FIG. 4 is a sample web application response page reporting a HTTP 404 (Resource Not Found) error.

FIG. 5 is a sample "Masked 404" error page, where the web application response page is also reporting a HTTP 404 (Resource Not Found) error but the response page does not return a 400-class response code.

DETAILED DESCRIPTION OF THE INVENTION

An improved web application security scanner is described herein. A web application security scanner exercises a web application to find vulnerabilities and/or functional errors. For example a scanner might identify files on a web application server that are accessible but should not be, errors in web application logic, vulnerabilities wherein the web application accepts altered or unexpected inputs instead of responding with an error message.

The examples herein are not intended to be exhaustive, but describe embodiments of the present invention. Where individual items are shown, multiple items might be present, unless otherwise indicated. Where an indefinite number of items are shown or described, such as by parenthetical references to (1), (2), . . . , (n), the actual number is not limiting, unless otherwise specified. It should be noted that, unless otherwise indicated, the domain names used in the examples are not intended to refer to actual domains and any similarity is merely coincidental.

Figure 1:
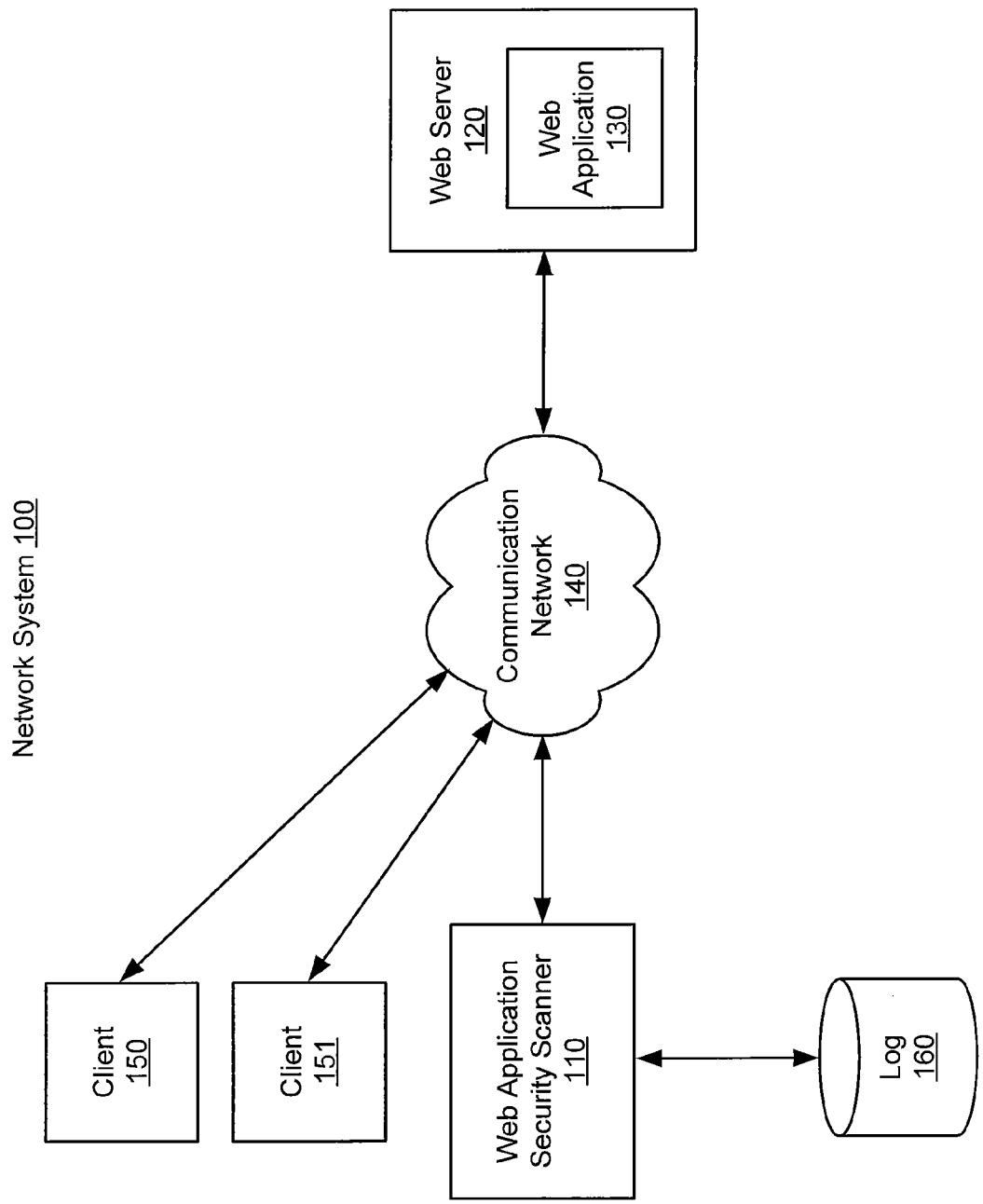
FIG. 1 is a high-level block diagram of a network employing a web application security scanner in accordance with embodiments of the invention.

FIG. 1 is a high-level block diagram of a network system 100 employing a web application security scanner 110. In one embodiment, as illustrated in FIG. 1, network system 100 includes web server 120 serving respective web application 130 to web application security scanner 110 via a communication network 140. Other users, such as client 150 and client 151 may be simultaneously served web application 130 by web server 102 via the same communication network 140. Communication network 140 may be any network, such as the Internet, a local area network (LAN), a wide area network (WAN), a wireless network, a wire-line network, etc. Web application security scanner 110 is also connected to a database 160 to log all activities and results.

Figure 2:
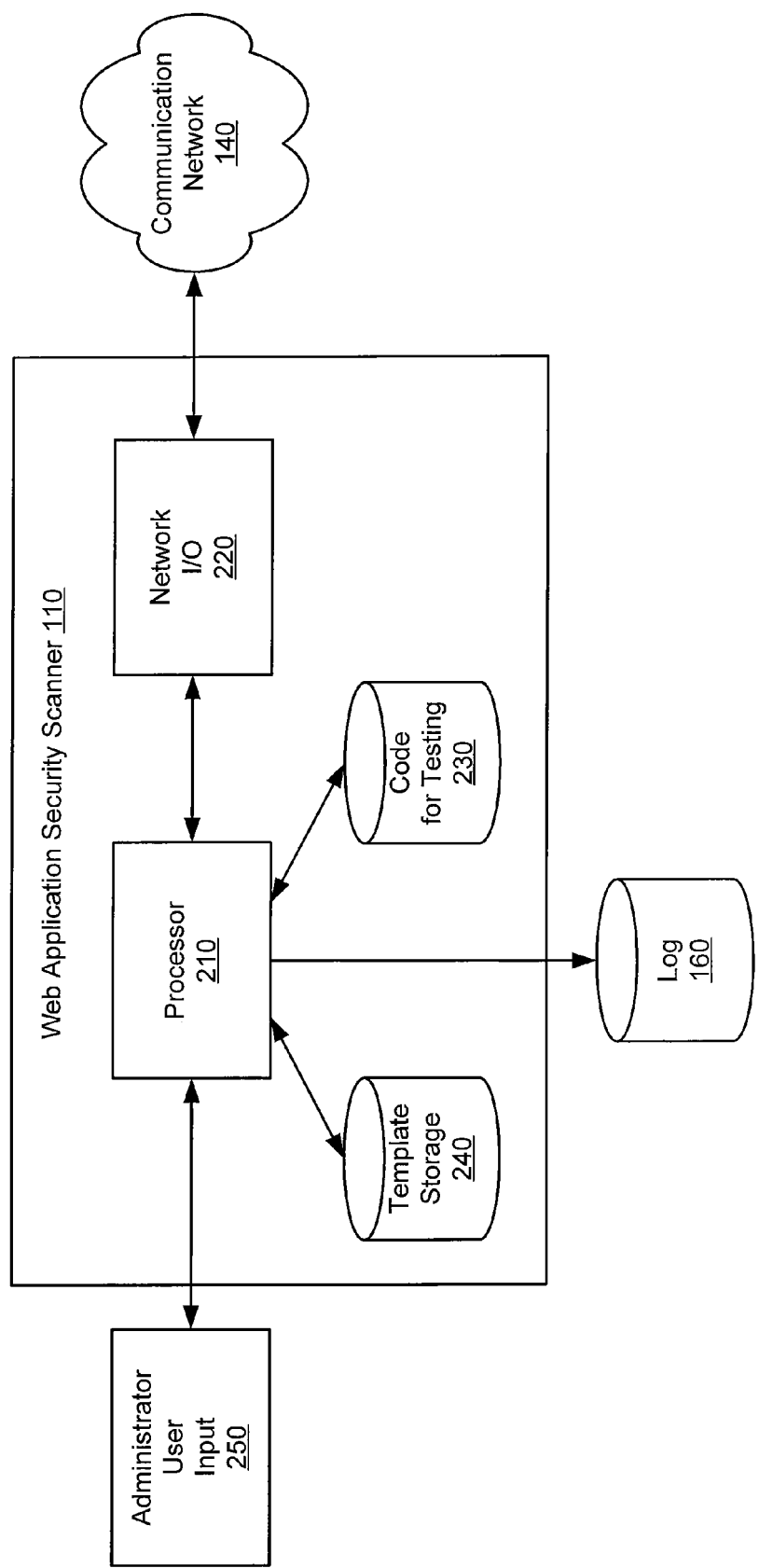
FIG. 2 is a high-level block diagram of a web application security scanner in accordance with embodiments of the invention.

FIG. 2 is a high-level block diagram of a web application security scanner 110. In one embodiment, as illustrated in FIG. 2, web application security scanner 110 includes a processor 210 configured to execute a first target request directed at a web application connected to communication network 140 via the network I/O 220. Processor 210 receives the first target request from a database 230 containing the code for testing. Processor 210 receives from the web application a first target response in response to the first target request. The first target response is stored in template storage 240. Processor 210 then executes a second target request directed at the web application and determined based on the first target request. Processor 210 receives a second target response in response to the second target request and compares the first target response to the second target response to determine an attribute of the first target response. Based on this comparison, the web application security scanner 110 can execute a classification-based matching process for deciding whether two responses are "close" or "of the same type". Administrator user input 250 can be used to adjust how this processor executes target requests and compares target responses. Web application security scanner 110 is also connected to a database 160 to log all activities and results.

A web application test suite, or "test suite", performs tests against a web application by sending client requests from a testing computer to the server running the web application and checking how the web application responds. A thorough web application security scan might involve thousands of checks and responses. As a result, some sort of programmatic analysis is needed. A test suite might execute a Web Application Security Scan (WASS) by issuing a series or requests to a web application in the form of test URIs Uniform Resource Identifiers) and noting the responses made by the web application. URIs can be dynamic, wherein the page referenced by the URI does not exist until a request is made and responses might also be dynamic in that they are generated to be specific to a particular request.

In various key points during a WASS, various HTTP (HyperText Transport Protocol) responses need to be evaluated. One such evaluation involves comparing one response against another. An example is where the scanner makes a request for a file that should not be provided to users. A good web application response is an error message denying access to the file. A bad web application response is a response that contains the file or a reference to the file. To evaluate the response the scanner might compare what it did receive to a reference page that represents the result from a known good web application, such as an error page indicating that the requested page could not be found or the user has no access to the file.

Error pages do not always follow a well-defined format and even with one web application, the error pages can be variable, so a scanner preferably includes logic for determining a "match" even when the compared responses are not identical. Response matching that compares two HTTP responses might use classification processes, such as "Local Sensitive Hashes", "Bayesian Inference", Support Vector Machines (SVMs), and/or other classification techniques. The term "fuzzy classification" is used herein to refer to one or more of such classification methods.

Response matching forms a basic building block that is used in various places in a WASS process to make decisions, some of which ultimately lead to a determination that a particular weakness or vulnerability exists in the web application. In some cases, exact matches will occur, but when they do not, a scanner needs to be more refined. Given two responses from the same web request, an exact comparison of content from the two will often yield differing results, such as differing timestamps, rotating advertisements and other reasons. Thus, the preferred scanner uses a classification-based matching process for deciding whether two responses are "close" or "of the same type".

Figure 3:
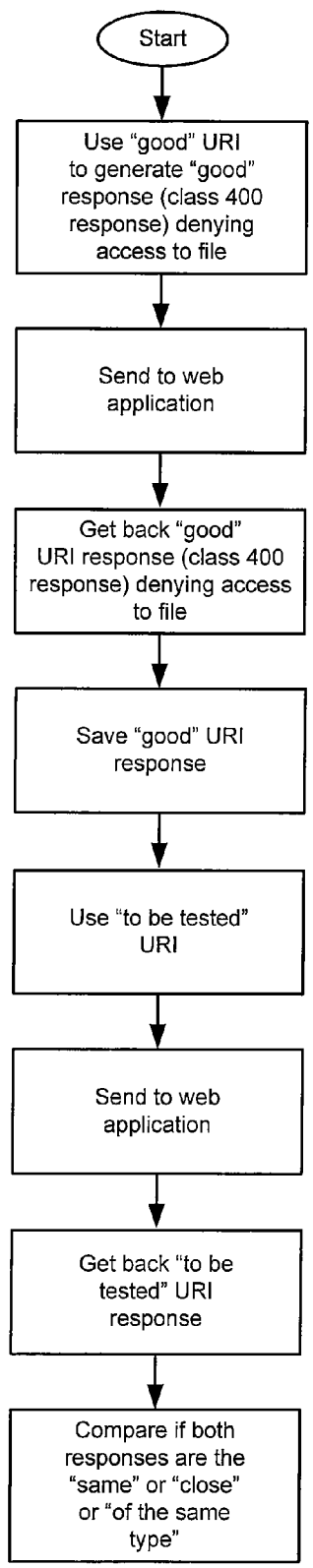
FIG. 3 is a flow diagram illustrating a method of providing for fuzzy classification in comparisons of scanner responses in accordance with embodiments of the invention.

FIG. 3 is a flow diagram illustrating how the above method of providing for fuzzy classification in comparisons of scanner responses may be implemented in accordance with embodiments of the invention.

Without loss of generality, three examples of the use of classification-based matching in a WASS process are described below.

1. Using Content Matching to Detect Masked "Resource Not Found" Responses.

One of the vulnerabilities of a web application is that it will return a resource when the resource is not supposed to be available. This can be especially problematic where the resource is a server-executable file, a password list, etc. A WASS process should attempt to access these files to determine if any are available. There is a large number of possible URIs to try (i.e., a large number of possible hidden files on a server). This might be done by sending a high volume of requests formed using common filenames and extensions in combination with existing paths that have been explored during a previous "spidering" of a web site. This approach should result in a response of "Resource Not Found" in the majority of cases. However, if any other interesting content is returned, it may be a sign that someone accidentally left a file behind, possibly divulging sensitive information or creating other security risks.

The HTTP protocol dedicates a class of response codes (in the 400-499 range) to variations of the meaning of "Resource Not Found". During the execution of the above-mentioned exploit, the scanner checks each response and verifies whether a real resource/file was accessed or a "Resource Not Found" error message was returned. A 400-class response code is rarely returned, because it renders very unpleasantly/unfriendly on a web browser. FIG. 4 is an example of such an unpleasant/unfriendly 400-class response code page. Developers will often redirect the user to a much more "user friendly" and descriptive page, which will likely return a good response code (200), because it is a valid page, but have content stating the fact that the resource that was asked for is not available. FIG. 5 is an example of such a descriptive "Masked 400-class" error page, where the web application response page is also reporting a "400-class error" but the response page does not return a 400-class response code. A scanner needs to deal with this as a resource not found, not as a resource found. Trusting a 200 response code would tell the scanner that a hidden resource (a vulnerability) was found when all that was "found" was an error page. This would typically result in massive numbers of "false positives", which greatly reduce the value/effectiveness of the scanner.

Using fuzzy classification on the responses, the scanner can more frequently detect responses that are in fact error pages. Such "prettified" error response pages, such as those reporting the equivalent of an HTTP Error 404 (Resource Not Found), can be detected using fuzzy classification.

For example, consider an ad-hoc approach in combination with a classification based matching algorithm, to detect a "Masked 404" error page. First, the scanner determines a possible request while scanning a web site http://www-.foo.bar/baz/myapp/. The scanner then attempts a manipulation in the hope of finding a resource by sending the request http://www.foo.bar/baz/myapp/login.cgi. This is referred to herein as a manipulated request, which should not return a valid response, and more generally the scanner request is referred to as a target request, that has a target response.

If the scanner sees a class 400 response to the manipulated request, it knows that the corresponding vulnerability does not exist. If scanner does not see a class 400 response, it sends out a series of handler tests for that target request, to be used to compare to the target response. Handler test requests are designed to a "Resource Not Found" response in nearly all expected situations. Ideally, the handler test request is as close as possible to the target request, causing a similar 404 behavior on the server to allow for simple modelling of the 404 behavior for the specific path and extension combination.

As an example of handler tests, if the scanner gets a response from the target request "http://www.foo.bar/baz/myapp/" and was not expecting a valid response, the scanner can send handler test requests that are similar to the target request. For example, the scanner might send requests in the following formats, wherein [RAND] represents a randomly generated string of text, which is highly unlikely to exist on the server, and so should trigger a "Resource Not Found" response to be compared against:

http://www.foo.bar/[RAND]
http://www.foo.bar/[RAND].cgi
http://www.foo.bar/baz/[RAND].cgi
http://www.foo.bar/baz/myapp/[RAND].cgi Error responses to 404 cases are often the same across a global server configuration or other domain or zone. However, exceptions do exist, where a specific path or extension will behave differently. To account for this, the scanner can be programmed to move from more general cases to more specific cases and note the server's "404 behavior." Each test result can be compared against, using a classification-matching process. A match against a 404 handler test would mean that the scanner has received a "Masked 404" or "Resource Not Found" and move on to test for the next possible vulnerability or target request.

The scanner might run handler test requests in the order specified above (from the most general to most specific) and move down the list each time the response to the target request (http://www.foo.bar/baz/myapp/login.cgi) does not "match" the handler test response. If the scanner works all the way down the list and continues to not have any matches, then the scanner can conclude, with a high degree of certainty, that the target response in question is a resource and not an error message.

An example process that a scanner might perform for each handler test is as follows. If the target response is a class 400 response, then the target response is obviously not a resource. If the target response and the handler test responses are class 300 (redirect) responses, then the scanner might compare the redirect URLs. If they match, then the scanner can label the target response as a "Masked 404", and therefore conclude it is not a resource. If the target response is a class 200 response and the handler test response is not, then the scanner can assume that the target response is a resource and behave accordingly. Where the scanner does not match against a handler test, it moves down the handler test list to a more specific test. If the end of the list is reached and still the target response appears to be a resource, then it is labeled as a vulnerable resource.

If both the target response and the handler test responses are class 200 responses, then the scanner can invoke a classification matching process to determine how close the target response's content is to the handler test response's content, such as by using fuzzy matching. If the target response matches beyond a predefined threshold, then the scanner can mark the target response as a "Masked 404", otherwise if they are sufficiently different, the scanner can label the manipulated response as a resource.

In all other cases, the scanner might labeled the target response as a "Masked 404", and therefore deem it to be not a resource. In some cases, even if the target response is identified as a resource, the resource can be ignored if there are other pages in the web site that are supposed to be accessible and do point to that target resource, which would be the case where the developer intended to use URIs that are sometimes considered security risk signals.

As described, a specific implementation of the detection of a Masked 404 message has been shown. It should be noted that the detection of a "Masked 404" or "Resource Not Found" response is useful in many parts of a WASS process run by a scanner, where the scanner needs to know whether it has stumbled onto something sensitive that needs to be reported as a vulnerability or it has merely run into a "Resource Not Found" page that happens to have "returned a good response" code.

2. Using Content Matching to Detect State Changes in a Web Application.

In order to be effective, a WASS process should be able to control server state in the same way a user does. For example, in order to exercise and test functionalities of an application that are only exposed to logged in users, the scanner needs to have a way of detecting whether it remains in a logged in state throughout its course.

Detection of session state is, in the simplest case, quite easy if the traditional HTTP Authentication scheme is used, a challenge of authorization is needed, a 401 unauthorized-response message is issued by the server. In other cases where URL- or HTTP-Cookie-based authentication is used, a more sophisticated approach is needed.

For this, the scanner might use an HTTP request provided by a WASS administrator that does not change authentication state but is affected by the state. For example, a request to view account preferences fits this requirement, because the request is almost always harmless and only works when logged in. At any time during a scan, the scanner can issue a current session verification request (SVR) to query if the session is still valid.

Responses for a typical SVR are rarely identical but are often very similar, so a scanner might use a fuzzy classification approach to interpret the response.

In a basic system, Bayesian inference can be used as part of a fuzzy classification system, with enough accuracy for some needs to determine if a response from the SVR was good or bad. In that system, a Bayes network is trained using techniques similar to Bayesian spam filters such as BogoFilter, available at http://bogofilter.sourceforge.net/, using a sample good response from sending the SVR immediately after logging in, and a sample bad response by modifying the SVR to remove credential information such as Authorization headers and HTTP Cookies.

A more sophisticated approach is taken in other embodiments, wherein a "Locality Sensitive Hash" function is used that allows for use of a standard "Nearest Neighbor" classification technique to determine if a response is good or bad.

3. Using Content Matching to Detect Outlying Cases, while Tampering with Application Parameters.

Another exploit that should be attempted by a WASS process is tested by tampering with input parameters of a web application in an effort to (1) either divulge sensitive information about the underlying implementation (error messages) or breach the web application's intended limits on data access by accessing unauthorized data, possibly from a different user account than the one currently logged into.

As an example of what a WASS process might include, assume that the scanner is provided with login information for user accounts A and B. As part of the WASS process, the scanner goes about the business of finding which web applications are available on a server, along with their input parameters. For a given web application, GET and POST parameters, as well as parameters from cookies are observed while logged in as user A and B.

Assume that for a given application, two parameters, x and y, are found. Denoting the various values for the respective users as xa, xb, ya, yb, the scanner attempts to make requests by swapping these parameters (one or more at a time) between the two user accounts. By swapping out parameters, it is possible to catch an "insufficient authorization" vulnerability.

Assume that the following requests are sent:
Original Requests:
R(xa, ya)-Ra- original request for user A
R(xb, yb)-Rb- original request for user B
The scanner then generates the following manipulated requests:
R(xb, ya)-Rm- Manipulated request wherein xa is swapped with xb to see if anything interesting is available from user B's account.

After running the response contents through a classification model embodied in the scanner, perhaps as a classification module and associated datasets, the scanner can computer and store three n-dimensional vectors representative of feature sets of the content of each response. Suppose the vectors Va, Vb and Vm correspond to Ra, Rb and Rm, respectively. If Va and Vb are treated as points in an n-dimensional space, there is an n-dimensional range in that space that encloses these two points. If Vm falls outside that space (or a constant magnitude multiple of that space) then the scanner can treat the parameter in question as either (1) being one that did not have any significant effect on the outcome, or (2) one that had enough effect to fall within the expected n-dimensional space and therefore is similar enough to a normal outcome that the scanner should flag the result for further processing, such as by flagging it for review by a human analyst to determine weather an Insufficient Authorization type of vulnerability was triggered.

A similar technique may be used while rotating values of parameters from a set of user provided values, in an attempt to see anything deemed unusual. These unusual scenarios could be triggered by input that is designed to create errors. These errors, if left unchecked by developers, could trickle up to the HTTP services and/or web browser, divulging sensitive information about the underlying implementations of the website. Often, such errors are the breadcrumbs that a savvy hacker needs to breach the web application's security implementation.

While the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

What is claimed is:

1. A method of testing a web application, wherein a web application is a program that operates on a server and interacts with clients that access the program over a network, wherein further the web application accepts parameters that define results generated from the web application, the method comprising:
   executing a first target request at a scanner, the first target request being directed at the web application and being a request to be tested;
   receiving a first target response in response to the first target request;

executing a second target request at a scanner, the second target request being directed at the web application and determined based on the first target request;
receiving a second target response in response to the second target request, the second target response being a predetermined target response;
comparing the first target response to the second target response to determine an attribute of the first target response;
determining whether the first target response is equal to the predetermined target response; and
if it is determined that the first target response is not equal to the predetermined target response:
executing one or more additional target requests, the additional target requests being directed at the web application and determined based on the first target request;
in response to the additional target requests, receiving a corresponding one or more additional target responses; and
comparing the additional target responses to the first target response to determine an attribute of the first target response,
wherein the predetermined target response is a hypertext transport protocol (HTTP) class response, comparing the first target response to the second target response includes using a fuzzy classification process, and comparing the additional target responses to the first target response includes using a fuzzy classification process.

2. The method of claim 1, wherein the attribute of the first target response is an indication of whether the response represents a resource or the absence of access to a resource.

3. The method of claim 1, wherein the fuzzy classification process includes one or more of a local sensitive hash, a Bayesian inference, or a support vector machine.

4. The method of claim 1, wherein the predetermined target response is a hypertext transport protocol (HTTP) class 400 response, and each of the additional target requests are in the form of a uniform resource identifier (URI) and include a randomly generated string of text.

5. The method of claim 4, wherein the one or more additional target requests begin with general URI's and move to more specific URI's.

6. The method of claim 1, wherein the first target response is determined to be a resource and not an error message if a predetermined number of additional target responses do not match the first target response.

7. The method of claim 1, further comprising:
determining whether the first target response and the second target response are HTTP class 200 responses; and
if it determined that the first target response and the second target response are HTTP class 200 responses, comparing the first target response to the second target response using a fuzzy classification process.

8. A system for testing a web application, wherein a web application is a program that operates on a server and interacts with clients that access the program over a network, wherein further the web application accepts parameters that define results generated from the web application, the system comprising:
a storage for template; and
a processor configured to execute a first target request directed at a web application, receive a first target response in response to the first target request, store the first target response in the storage for template, execute a second target request directed at the web application and determined based on the first target request, receive a second target response in response to the second target request, retrieve the first target response from the storage for template, and compare the first target response to the second target response to determine an attribute of the first target response,
wherein comparing the first target response to the second target response includes using a fuzzy classification process;
wherein the first target request and the second target request are current session verification requests (SVR's), and the attribute of the first target response indicates whether the scanner is in a logged-in state; and
wherein the second target request is executed immediately after the scanner logs in or the first target request is an SVR modified to remove credential information.

9. The system of claim 8, wherein the fuzzy classification process includes one or more of a local sensitive hash, a Bayesian inference, or a support vector machine.

10. A non-transitory computer-readable medium tangibly embodying a program of machine-readable instructions executable by a digital processing apparatus having stored thereon instructions configured to test a web application, comprising:
program code for executing a first target request at a scanner, the first target request being directed at the web application and being a request to be tested;
program code for receiving a first target response in response to the first target request;
program code for executing a second target request at a scanner, the second target request being directed at the web application and determined based on the first target request;
program code for receiving a second target response in response to the second target request, the second target response being a predetermined target response;
program code for comparing the first target response to the second target response to determine an attribute of the first target response;
program code for determining whether the first target response is equal to the predetermined target response; and
if it is determined that the first target response is not equal to the predetermined target response:
executing one or more additional target requests, the additional target requests being directed at the web application and determined based on the first target request;
in response to the additional target requests, receiving a corresponding one or more additional target responses; and
comparing the additional target responses to the first target response to determine an attribute of the first target response,
wherein the predetermined target response is a hypertext transport protocol (HTTP) class response, comparing the first target response to the second target response includes using a fuzzy classification process, and comparing the additional target responses to the first target response includes using a fuzzy classification process.

11. The non-transitory computer-readable medium of claim 10, wherein the attribute of the first target response is an indication of whether the response represents a resource or the absence of access to a resource.

12. The non-transitory computer-readable medium of claim 10, wherein the fuzzy classification process includes one or more of a local sensitive hash, a Bayesian inference, or a support vector machine.

13. A method of testing a web application, wherein a web application is a program that operates on a server and interacts with clients that access the program over a network, wherein further the web application accepts requests that define responses generated from the web application, the method comprising:
- sending a first request to the web application, wherein the first request is known to generate a first response with a first attribute from the web application;
- receiving the first response with the first attribute from the web application in response to the first request;
- sending a second request to the web application, wherein the second request is a request to be tested;
- receiving a second response with a second attribute from the web application in response to the second request; and
- comparing the first attribute of the first response to the second attribute of the second response to determine if they are the same, close or of the same type,
- wherein comparing the first attribute of the first response to the second attribute of the second response includes using a fuzzy classification process;
- wherein the first request and the second request are current session verification requests (SVR's), and the first attribute of the first response indicates whether the scanner is in a logged-in state; and
- wherein the second request is executed immediately after the scanner logs in or the first request is an SVR modified to remove credential information.

14. The method of claim 13, wherein the fuzzy classification process includes one or more of a local sensitive hash, a Bayesian inference, or a support vector machine.

15. The computer-readable medium of claim 10, wherein the predetermined target response is a hypertext transport protocol (HTTP) class 400 response, and each of the additional target requests are in the form of a uniform resource identifier (URI) and include a randomly generated string of text.

16. The computer-readable medium of claim 15, wherein the one or more additional target requests begin with general URI's and move to more specific URI's.

17. The computer-readable medium of claim 10, wherein the first target response is determined to be a resource and not an error message if a predetermined number of additional target responses do not match the first target response.

18. The computer-readable medium of claim 10, further comprising:
- program code for determining whether the first target response and the second target response are HTTP class 200 responses; and
- if it determined that the first target response and the second target response are HTTP class 200 responses, comparing the first target response to the second target response using a fuzzy classification process.

* * * * *